United States Patent
Shimizu et al.

(10) Patent No.: US 6,597,646 B1
(45) Date of Patent: Jul. 22, 2003

(54) DISK DEVICE

(75) Inventors: Masahiko Shimizu, Houston, TX (US); Yorio Takahashi, Ehime (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/646,934

(22) PCT Filed: Jan. 20, 2000

(86) PCT No.: PCT/JP00/00267
§ 371 (c)(1), (2), (4) Date: Nov. 30, 2000

(87) PCT Pub. No.: WO00/43998
PCT Pub. Date: Jul. 27, 2000

(30) Foreign Application Priority Data

Jan. 25, 1999 (JP) .............................. 11-15035

(51) Int. Cl.⁷ ................................. G11B 7/00
(52) U.S. Cl. .................................... 369/47.25
(58) Field of Search ........................ 369/44.34, 44.35, 369/47.25, 47.36, 47.38

(56) References Cited

U.S. PATENT DOCUMENTS 5,298,812 A  3/1994 Bigge ......................... 307/519
6,088,315 A * 7/2000 Ando ......................... 369/50

FOREIGN PATENT DOCUMENTS

| JP | 2-96657 | 8/1990 |
| JP | 3-142750 | 6/1991 |
| JP | 6-96519 | 4/1994 |
| JP | 6-318364 | 11/1994 |
| JP | 11-328822 | 11/1999 |
| WO | WO00/43998 | 7/2000 |

* cited by examiner

Primary Examiner—Nabil Hindi
(74) Attorney, Agent, or Firm—Parkhurst & Wendel, L.L.P.

(57) ABSTRACT

A disk device for controlling the revolution of a disk, and the operation of a focus coil and a tracking coil with high precision even during the low-velocity revolution of a disk is provided. A control signal gain switch circuit (12) is provided as control signal gain switch means for switching depending on an operation state and outputting a gain of at least one of a spindle motor control signal (10) output to a spindle motor control circuit (3) as the first control unit for controlling a spindle motor (2) which revolves the disk (1), and a focus tracking control signal (11) output to the focus tracking control circuit (4) as the second control unit for controlling an optical pickup (5) which reads information in the disk (1) and outputs a high frequency signal.

6 Claims, 5 Drawing Sheets

FIG.2
(a)
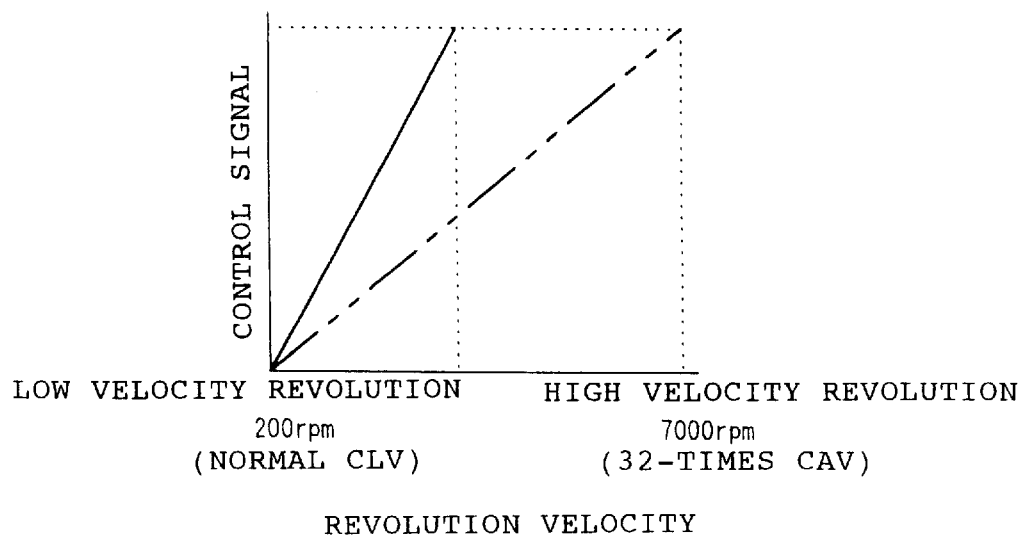
(b) ENLARGED CONTROL SIGNAL
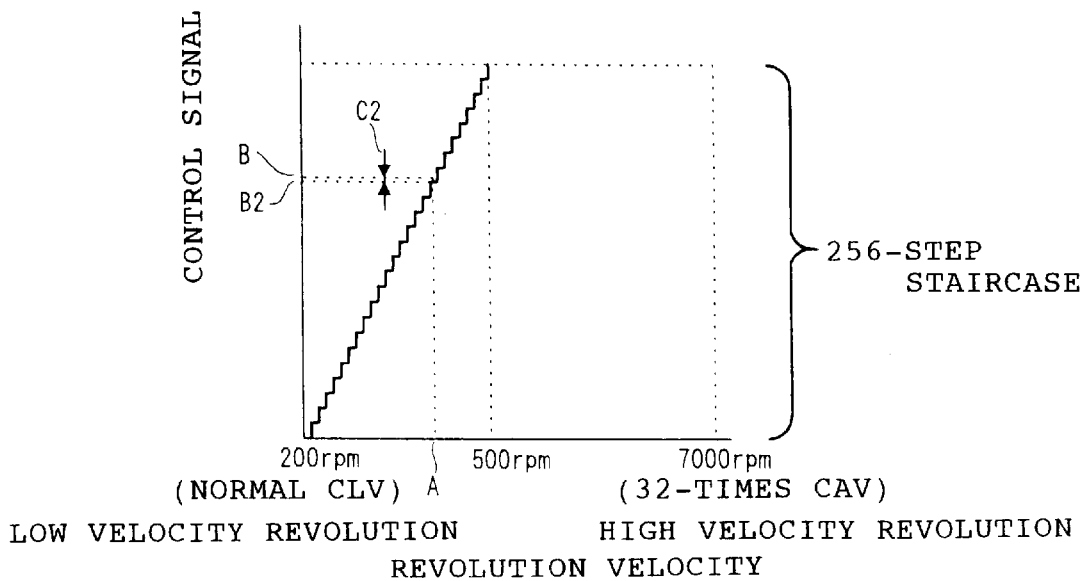

FIG. 5
(a)
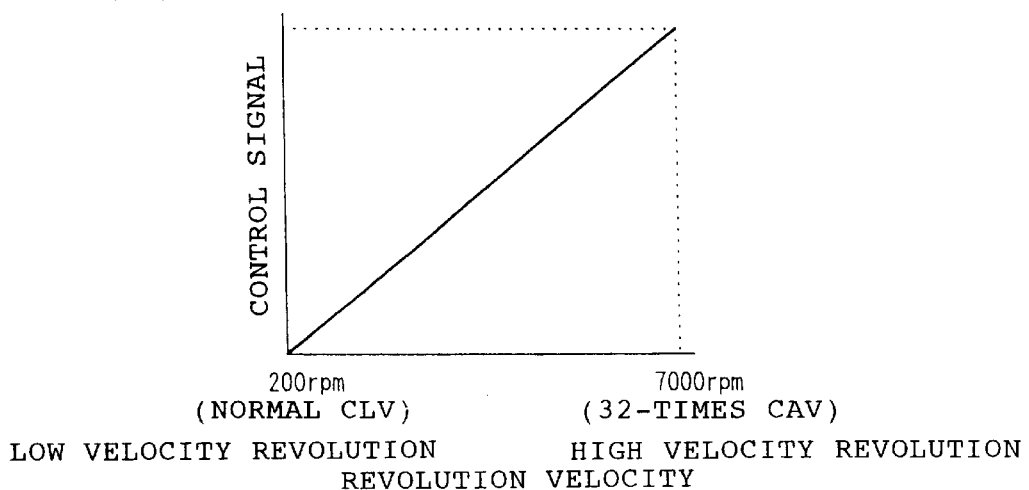
(b) ENLARGED CONTROL SIGNAL
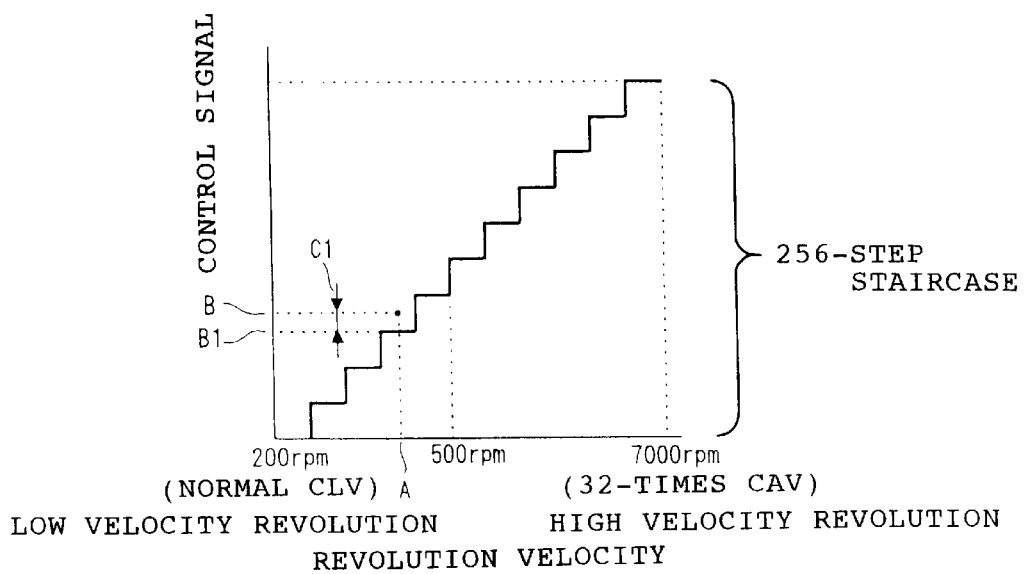

DISK DEVICE

FIELD OF THE INVENTION

The present invention relates to a disk device, and more specifically to a disk device having a larger control range in number of revolutions of a disk.

BACKGROUND OF THE INVENTION

A conventional disk device can be, for example, a CD-ROM reading device and the like.

As shown in FIG. 4, the CD-ROM reading device is used as a peripheral device of a computer, receives an instruction from an external device (for example, a host computer 16) through an interface circuit 15 having a CD-ROM signaling circuit, searches for a target position, reads target data from the data stored in a disk 1, and transfers it to an external device. A CD (compact disk) and a CD-ROM disk is to be read at the velocity of a CLV (constant linear velocity).

However, a CD-ROM reading device as a peripheral device of a computer is firmly requested to realize a high-velocity search and a constant high-velocity read without increasing the cost. To satisfy the request, a CD-ROM disk is read four times, eight times, etc. as fast as the CLV in a constant high-velocity reading process. However, to increase the search velocity in the constant high-velocity reading process performed at four times, eight times, etc. as high as the CLV, the load of a disk motor becomes very large, and a costly and large disk motor is required.

Therefore, a device capable of reading at a CAV (constant angular velocity) a disk storing data at a CLV, and a wide range CLV system capable of performing a high-velocity search in a very wide read range in the CLV reading process, and performing a constant high velocity reading process have been recently realized. These device and system have realized a high-velocity searching process using an inexpensive and small motor with the load of a disk motor considerably reduced.

A reading system of the conventional CD-ROM reading device is configured as shown in FIG. 4. A signal read from the disk 1 by an optical pickup 5 is provided for an RF (high frequency) amplifier 7. The RF amplifier 7 extracts a high-frequency signal corresponding to the data of a disk from the output of the optical pickup 5, a focus error signal, and a tracking error signal, and provides them for a signaling circuit 8.

The signaling circuit 8 generates focus tracking control signals 11 for servo focus and servo tracking, and an EFM (eight to fourteen modulation) signal obtained by binarizing an RF signal. A focus tracking control circuit 4 controls a focus tracking coil 6 comprising a focus coil and a tracking coil according to the focus tracking control signal 11, and reads the information in the disk 1 using the optical pickup 5.

The signaling circuit 8 is provided with a phase lock loop circuit (PLL circuit) for generating a PLL clock synchronous with the EFM signal to read the EFM signal. The generation signal frequency for a phase lock loop is based on 4.3218 MHz for the CLV control, and the variable range is ±several tens %. In the CAV control, the signaling circuit 8 computes a revolution velocity detection signal 9 from a spindle motor control circuit 3, and a spindle motor control signal 10 is provided for the spindle motor control circuit 3 such that the disk 1 can be revolved at the CAV. The CLV/CAV can be switched by a system control circuit 13. When a disk is read at the CLV, the spindle motor control signal 10 obtained by computing the RF signal by the signaling circuit 8 is provided for the spindle motor control circuit 3.

Since the revolution velocity detection signal 9 is constantly output with the RF signal missing if the disk 1 revolves, it is used to confirm the revolution velocity of the disk 1. The signaling circuit 8 monitors the revolution velocity detection signal 9, and can confirm the revolution state of the disk 1 in the off-focus or off-tracking state. Therefore, even in the off-servo-focus state or the off-servo-tracking state, the disk 1 can be prevented from abnormally revolving or stopping.

However, in the conventional disk device, the output width ranges of a control signal and a spindle motor control signal for servo focus and servo tracking are set such that the disk device can be safely controlled when the motor which revolves the disk is revolving at the highest velocity. For example, at a 32-time high velocity, the number of revolutions of the disk is 7,000 rpm. On the other hand, in the case of low-velocity revolutions at a normal velocity, the number of revolutions of the disk is a minimum of 200 rpm. That is, the highest velocity is 35 times as fast as the lowest velocity. Therefore, the control signal during the low-velocity revolution indicates a poor S/N ratio, thereby causing a problem of unstable control.

Practically, with a decreasing revolution velocity, the output level of the spindle motor control signal 10 and the focus tracking control signal 11 becomes lower as shown in FIG. 5(a). When the waveform shown in FIG. 5(a) is enlarged, it proves that the waveform changes in the form of a staircase as shown in FIG. 5(b). Since the spindle motor control signal 10 and the focus tracking control signal 11 are digital signals, they change in the form of, for example, a 256-step staircase.

As shown in FIG. 5(b), when the disk 1 is read with the number of revolutions of A in the range of the low velocity of, for example, 200 rpm to 500 rpm, it is desired that the output levels of the spindle motor control signal 10 and the focus tracking control signal 11 are the levels at which no staircase-shaped waveforms appear as shown by B in FIG. 5(b). However, since the output level of the control signal shows a staircase-shaped waveform by a digital signal, it actually indicates B1 shown in FIG. 5(b), thereby causing the control error of C1 which is the difference between B and B1. The control error C1 is quantization noise, which indicates a relatively large value during the low-velocity revolution as compared with the high-velocity revolution. That is, during the low-velocity revolution, the S/N ratio is low, and the revolution control or the focus tracking control of a disk becomes unstable.

DISCLOSURE OF THE INVENTION

The present invention aims at providing a disk device for controlling the revolution of a disk, and the operation of a focus coil and a tracking coil with high precision even during the low-velocity revolution of a disk.

The disk device of the present invention includes a control signal gain switch means for switching depending on the operation state and outputting a gain of at least one of a digital control signal output to the first control unit for controlling a motor which revolves a disk, and a digital control signal output to the second control unit for controlling reading means for reading information in the disk and outputting a high frequency signal.

According to the present invention, during the low-velocity revolution of a disk, the revolution of a disk, and the operation of a focus coil and a tracking coil can be controlled with high precision.

The first embodiment of the disk device according to the present invention includes a first control unit for controlling a motor for revolving a disk; a second control unit for controlling reading means for reading the information in the disk, and outputting a high frequency signal; signaling means for generating a digital control signal for controlling the operation of the motor and the reading means according to the high frequency signal; and control signal gain switch means for switching and outputting a gain of at least one of a digital control signal output to the first control unit and a digital control signal output to the second control unit based on an operation state. During the low velocity disk revolution, a digital control signal can be output with high precision, and the revolution of a disk, and the operations of a focus coil and a tracking coil can be controlled with high precision.

The disk device according to the second embodiment of the present invention controls a disk motor based on the detection result of the revolution velocity detection means of a disk. That is, the device is configured using the signaling means for generating a digital control signal for controlling the revolution velocity of a motor based on the detection result of the revolution velocity detection means.

The disk device according to the third embodiment of the present invention corresponds to a system obtained by combining the CLV control according to the first embodiment of the present invention with the CAV control according to the second embodiment of the present invention. That is, the device is configured using signaling means for generating a digital control signal for controlling the operation of the reading means according to a high frequency signal, and for controlling the revolution velocity of a motor by selectively switching either according to a high frequency signal or based on the detection result of the revolution velocity detection means.

Furthermore, the disk device according to the present invention is configured such that the control signal gain switch means can switch a gain depending on the number of revolutions of a disk. During the low velocity disk revolution, a digital control signal can be output with high precision, and the revolution of a disk, and the operations of a focus coil and a tracking coil can be controlled with high precision. Even when the revolution velocity is reduced due to a scratch, a spot, etc. on a disk, the gain of a digital control signal can be switched depending on the revolution velocity.

In addition, the disk device according to the present invention can be controlled in the method of changing the gain of an analog signal when a control signal is an analog output. That is, the digital control signal from the first or second control unit is an analog signal output through a D/A converter circuit, and the control signal gain switch means changes the output level of an analog signal.

Furthermore, the disk device of the present invention uses the method of changing the peak value of a rectangular wave when a control signal is a PWM (pulse width modulation) output. That is, the first control unit or the second control unit is a digital servo controller, and a control signal from one of these control units is a PWM output for control using a variable width of a rectangular wave having a constant peak value. The control signal gain switch means performs PAM (pulse amplitude modulation) control for changing the peak value of an output pulse. As in the case of an analog output, a lower price device can be realized because the D/A converter circuit can be omitted from the signaling circuit, and a power-saving and low-heating disk device can be provided with a disk revolving at a high velocity, and with the smallest electric loss when the disk is driven by a motor driver if a spindle motor driver corresponding to the PWM and PAM control can be used.

BRIEF DESCRIPTION OF THE DRAWINGS

FIG. 2 shows a waveform indicating the output level of a control signal for the number of revolutions of a disk according to the embodiment;

FIG. 5 shows a waveform indicating the output level of the control signal for the number of revolutions of the conventional disk.

EMBODIMENTS

The disk device of the present invention is described below according to the first and second practical embodiments.

Embodiment 1

Figure 1:
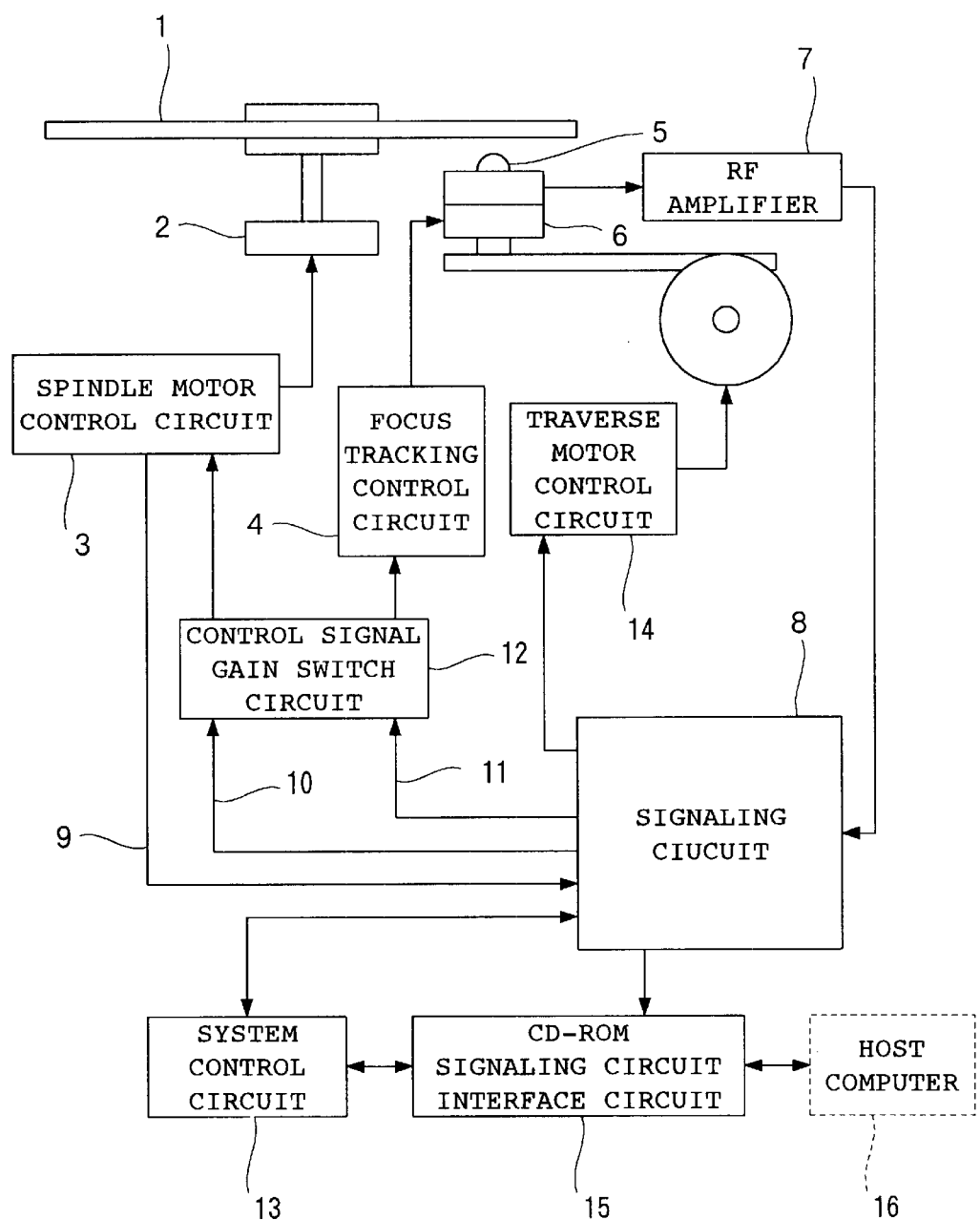
FIG. 1 shows the configuration of the CD-ROM drive according to an embodiment of the present invention.
Figure 4:
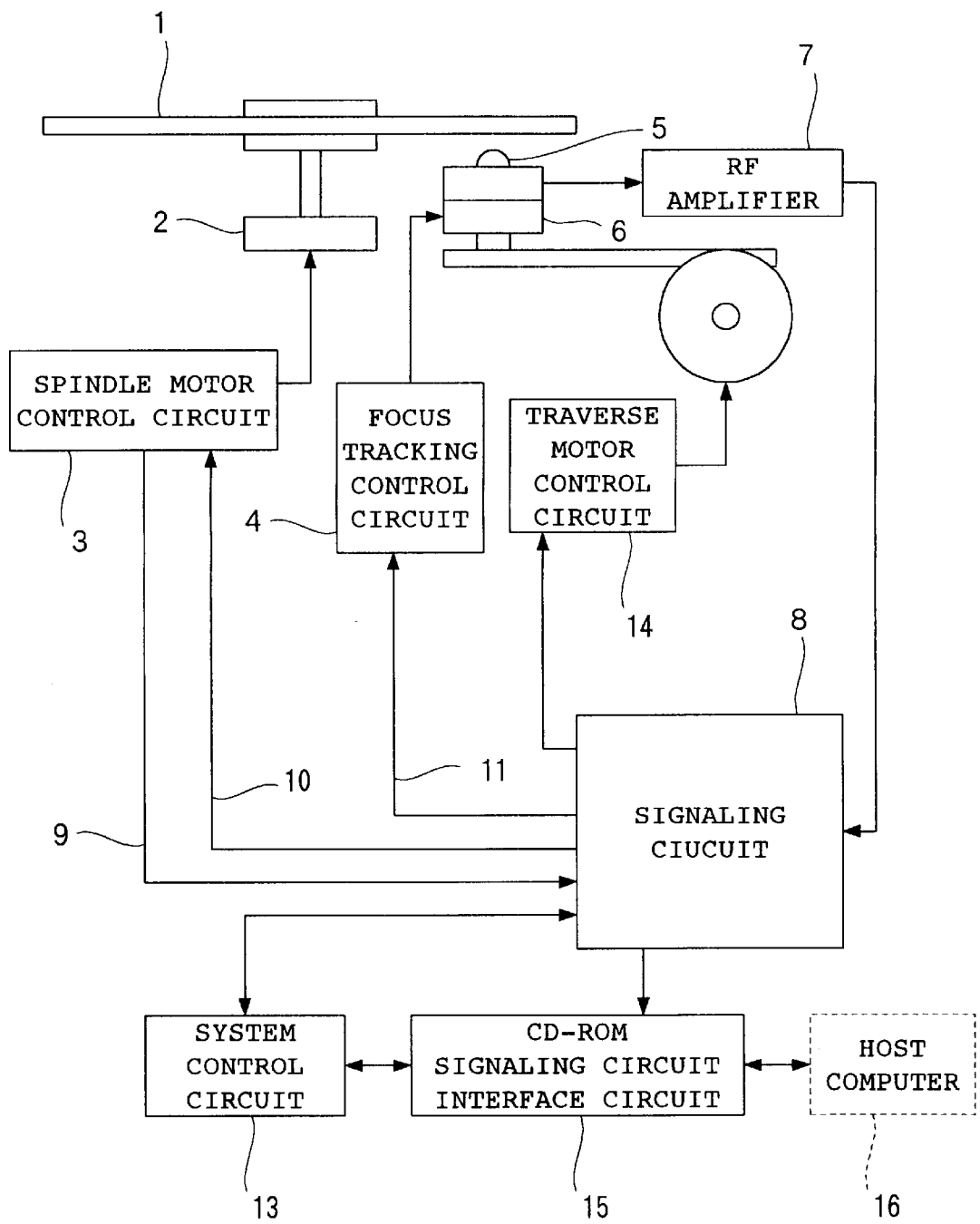
FIG. 4 is a block diagram of the configuration of the conventional CD-ROM drive.

The disk device according to an embodiment of the present invention shown in FIG. 1 comprises: the spindle motor control circuit 3 as the first control unit for controlling a spindle motor 2 for revolving the disk 1 as in the conventional example shown in FIG. 4; the focus tracking control circuit 4 functioning as the second control unit for controlling the optical pickup 5 for reading the information in the disk 1 and outputting a high frequency signal; and the signaling circuit 8 functioning as signaling means for generating a digital control signal for control of the operations of the spindle motor 2 and the optical pickup 5 according to the high frequency signal. This disk device is different from a conventional disk device in that a control signal gain switch circuit 12 functioning as control signal gain switch means for switching and outputting depending on the operation state the gains of the spindle motor control signal 10 as a digital control signal output to the spindle motor control circuit 3 and the focus tracking control signal 11 as a as a digital control signal output to the focus tracking control circuit 4 is additionally provided.

The control signal gain switch circuit 12 is configured to switch and output depending on, for example, the number of revolutions of the disk 1 as an operation state the gain of the spindle motor control signal 10 and the gain of the focus tracking control signal 11. Practically, the gain of the focus tracking control signal 11 from the signaling circuit 8 is switched depending on the number of revolutions of the disk 1, and is output to the focus tracking control circuit 4, Likewise, the gain of the spindle motor control signal 10 is switched depending on the number of revolutions of the disk 1, and is output to the spindle motor control circuit 3.

Described below will be a reading operation at a normal velocity with the disk 1 operated at a low revolution velocity in the disk device capable of control the revolution of the disk 1 in a wide range of the number of revolutions (for example, 200 rpm to 7000 rpm).

As shown in 2($a$), when the disk 1 is to be read at the number of revolutions A, for example, 200 to 500 rpm, the control signal gain switch circuit 12 reduces the gains of the spindle motor control signal 10 output from the signaling circuit 8 and the focus tracking control signal 11 to ¼, and outputs them to the spindle motor control circuit 3 and the focus tracking control circuit 4 respectively.

When the gains of the spindle motor control signal 10 and the focus tracking control signal 11 are reduced to ¼, the output levels of the spindle motor control signal 10 and the focus tracking control signal 11 indicate the waveforms as shown by the solid lines, and is four times the level of the waveform indicated by the two dots and one dash line. The waveform indicated by the two dots and one dash line shown in FIG. 2(*a*) is the same as the waveform shown in FIG. 4(*a*).

The waveform indicated by the solid line shown in FIG. 2(*a*) is enlarged as shown in FIG. 2(*b*). These figures show that the height of the step of the control signal is shorter than that of the waveform shown in FIG. 5(*b*). This is because the waveform changes in the form of, for example, a 256-step staircase in the range of a low-velocity revolution of 200 rpm to 500 rpm. Therefore, when a disk is read at the number of revolutions of A, the output levels of the spindle motor control signal 10 and the focus tracking control signal 11 are indicated by B2 shown in FIG. 2(*b*). The value of the output level B2 is closer to the value of the optimum output level B than the output level B1 of the conventional technology. The control error (quantization error) C2 can be reduced to ¼, on the average of the control error C1 of the conventional technology, thereby preventing the deterioration in precision of the spindle motor control signal 10, the focus error signal, and the focus tracking control signal 11.

With the configuration, a precise digital control signal can be output even during the low-velocity revolution of the disk 1, and the revolution of the disk 1, and the operation of the focus tracking coil 6 can be controlled with high precision. Therefore, even when the control range of the number of revolutions of the disk 1 is wide, the detection time of the revolution velocity can be shortened, thereby realizing stable control of the disk 1 with high precision.

According to the present embodiment, the gains of the spindle motor control signal 10 and the focus tracking control signal 11 are reduced to, for example, ¼. However, the reduction is not limited to ¼, but can be ½, ⅛, etc.

In the present embodiment, the gains of both spindle motor control signal 10 and focus tracking control signal 11 are switched, but the gain of only one of them can be switched. For example, when the gain of only the spindle motor control signal 10 is switched, the revolution of the spindle motor 2 can be controlled with high precision in a wide range of the number of revolutions from low to high velocity. When the gain of only the focus tracking control signal 11 is switched, the focus tracking can be controlled with high precision in a wide range of the number of revolutions from low to high velocity.

According to the embodiment 1, the second control unit is the focus tracking control circuit 4. However, the same effect can be obtained by using a traverse motor control circuit 14 for controlling the actuator which moves the optical pickup 5 to the target position of the disk 1 as the second control unit to switch and output by the control signal gain switch circuit 12 the gain of the control signal output to the traverse motor control circuit 14.

Embodiment 2

Figure 3:
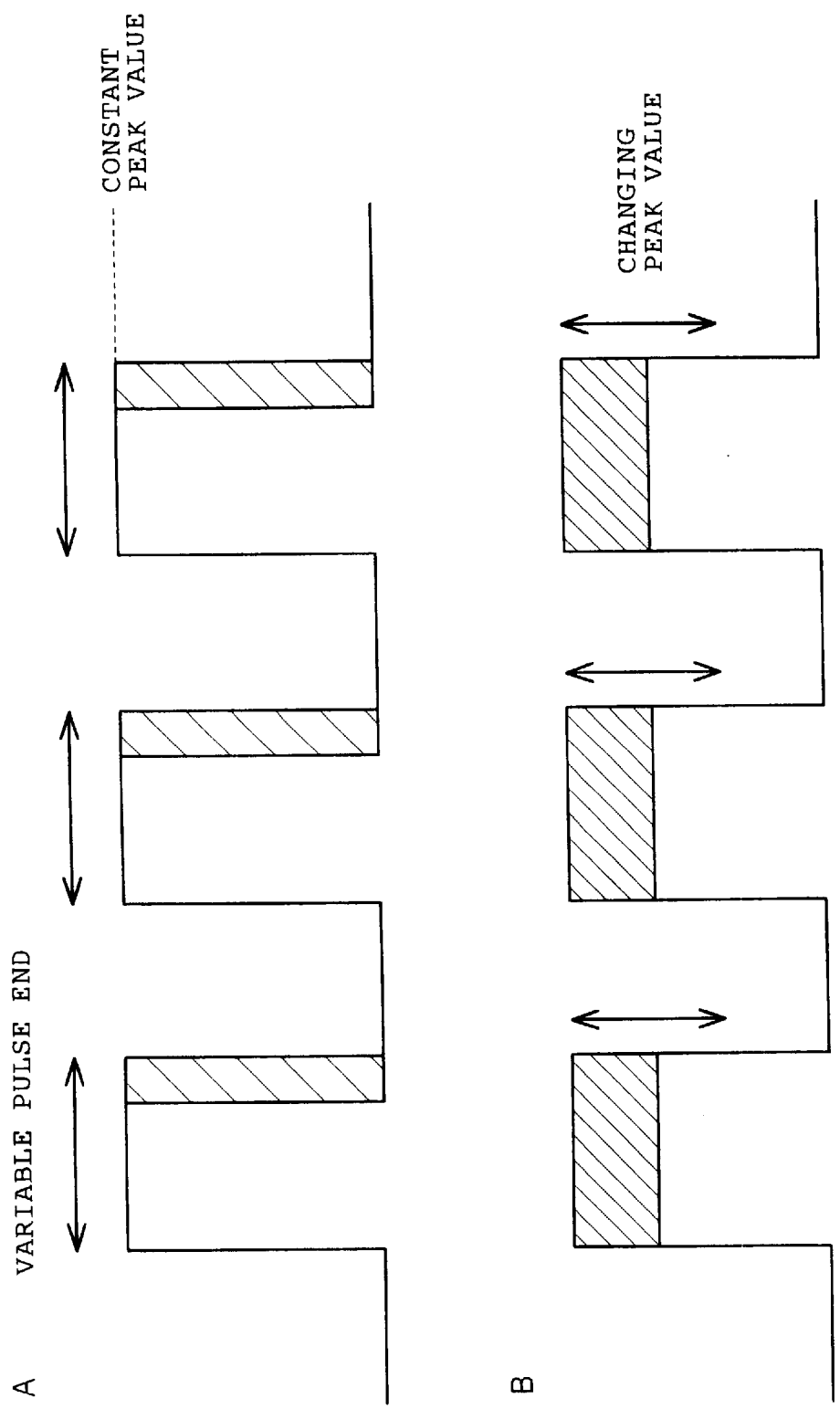
FIG. 3 shows a waveform of a pulse when the control signal according to the embodiment is a PWM output.

The embodiment in which a control signal is a PWM (pulse width modulation) output is described by referring to FIGS. 1 and 3.

The output signals 10 and 11 from the signaling circuit 8 are shown in FIG. 3(*a*), and a rectangular wave of a constant peak value is output. The control signal gain switch circuit 12 switches the control signal gain by varying the peak value of the pulse as shown in FIG. 3(*b*).

The pulse signal is integrated by the spindle motor control circuit 3 or the integration circuit not shown in the drawings but is provided between the focus tracking control circuit 4 and the control signal gain switch circuit 12, and is converted into an analog signal to obtain a control signal for control.

When the spindle motor 2 is a brushless motor, a control signal of the spindle motor 2 can be generated based on a pulse directly input using the spindle motor control circuit 3 corresponding to a PWM (pulse width modulation) input and a PAM (pulse amplitude modulation) input.

In addition, it is not always necessary for the output signals 10 and 11 from the signaling circuit 8 to be a complete rectangular wave. That is, a gain can be varied by changing the peak value of an output signal by controlling the operation by the width of a periodic output signal.

Thus, according to the disk device of the present invention, during the low-velocity revolution of a disk, a high-precision digital control signal can be output, and the revolution of a disk, and the operation of a focus coil and a tracking coil can be controlled with high precision by including a control signal gain switch means for switching depending on the operation state and outputting a gain of at least one of a digital control signal output to the second control unit for controlling a motor which revolves a disk, and a digital control signal output to the second control unit for controlling the pickup reading the information in the disk and outputting a high frequency signal. Therefore, even when the control range of the number of revolutions of a disk is wide, the detection time of the revolution velocity can be shortened, and a disk can be stably controlled with high precision.

In addition, with the configuration in which the control signal gain switch means of a disk device is designed to switch a gain of a digital control signal depending on the number of revolutions of a disk, a digital control signal can be output with high precision, and the revolution of a disk, and the operations of a focus coil and a tracking coil can be controlled with high precision during the low velocity disk revolution. Even when the revolution velocity is reduced due to a scratch, a spot, etc. on a disk, the gain of a digital control signal can be switched depending on the revolution velocity.

What is claimed is:

1. A disk device, comprising:
   a first control unit for controlling a motor for revolving a disk;
   a second control unit for controlling reading means for reading information in the disk and outputting a high frequency signal;
   signaling means for generating a digital control signal for controlling the operation of the motor and the reading means according to the high frequency signal; and
   control signal gain switch means for switching between a gain of a digital control signal output to the first control unit and a digital control signal output to the second control unit based on an operation state.

2. A disk device, comprising:
   a first control unit for controlling a motor for revolving a disk;
   a second control unit for controlling reading means for reading information in the disk and outputting a high frequency signal;

revolution velocity detection means for detecting a revolution velocity of the motor;

signaling means for generating a digital control signal for controlling an operation of the reading means according to the high frequency signal and the revolution velocity of said motor according to a detection result of said revolution velocity detection means; and control signal gain switch means for switching between a gain of a digital control signal output to the first control unit and a digital control signal output to the second control unit based on an operation state.

3. A disk device, comprising:

a first control unit for controlling a motor for revolving a disk;

a second control unit for controlling reading means for reading information in the disk and outputting a high frequency signal;

revolution velocity detection means for detecting a revolution velocity of the motor;

signaling means for controlling an operation of said reading means according to the high frequency signal, and generating a digital control signal for selectively switching and controlling whether to control the revolution velocity of said motor according to the high frequency signal or to control the revolution velocity of said motor based on a detection result of said revolution velocity detection means; and control signal gain switch means for switching between a gain of a digital control signal output to the first control unit and a digital control signal output to the second control unit based on an operation state.

4. The device according to claim 1, wherein said control signal gain switch means switches a gain depending on a number of revolutions of the disk.

5. The device according to claim 1, wherein a digital control signal from said first control unit or said second control unit is an analog signal output through a D/A converter circuit, and wherein the control signal gain switch means changes an output level of the analog signal.

6. The device according to claim 1, wherein the first control unit or said second control unit is a digital servo controller, and a control signal from the control units is a PWM output for control by varying an amplitude of a rectangular wave of a constant peak value, and wherein the control signal gain switch means performs PAM control in which a peak value of the output pulse is changed.

* * * * *